(12) United States Patent
You et al.

(10) Patent No.: US 12,149,945 B2
(45) Date of Patent: Nov. 19, 2024

(54) SUBSCRIPTION DATA UPDATE METHOD AND APPARATUS, NODE, AND STORAGE MEDIUM

(71) Applicant: ZTE Corporation, Shenzhen (CN)

(72) Inventors: Shilin You, Shenzhen (CN); Jiyan Cai, Shenzhen (CN); Zhaoji Lin, Shenzhen (CN); Jin Peng, Shenzhen (CN); Yuze Liu, Shenzhen (CN); Zhen Xing, Shenzhen (CN); Jigang Wang, Shenzhen (CN); Min Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 241 days.

(21) Appl. No.: 17/988,431

(22) Filed: Nov. 16, 2022

(65) Prior Publication Data
US 2023/0232240 A1   Jul. 20, 2023

Related U.S. Application Data

(63) Continuation of application No. PCT/CN2021/121564, filed on Sep. 29, 2021.

(30) Foreign Application Priority Data

Oct. 16, 2020 (CN) .......................... 202011111639.9

(51) Int. Cl.
*H04W 12/72* (2021.01)
*H04W 12/0433* (2021.01)
*H04W 12/06* (2021.01)

(52) U.S. Cl.
CPC ....... *H04W 12/72* (2021.01); *H04W 12/0433* (2021.01); *H04W 12/06* (2013.01)

(58) Field of Classification Search
USPC .............................................................. 726/6
See application file for complete search history.

(56) References Cited

U.S. PATENT DOCUMENTS 11,330,069 B2 * 5/2022 Zong ..................... H04W 24/02
11,659,387 B2 * 5/2023 Nair ...................... H04W 12/06
                                                              455/411

(Continued)

FOREIGN PATENT DOCUMENTS

| CN | 112512044 A | 3/2021 |
| WO | WO 2020/031157 A1 | 2/2020 |
| WO | WO 2020/173863 A1 | 9/2020 |

OTHER PUBLICATIONS

Extended European Search Report in International Application No. PCT/CN2021/121564 dated Jan. 8, 2024, 13 pages.

(Continued)

*Primary Examiner* — Sargon N Nano
(74) *Attorney, Agent, or Firm* — Crowell & Moring LLP

(57) ABSTRACT

Provided are a subscription data update method and apparatus, a node, and a storage medium, where the method includes: in a case where a first network function node determines that authentication and key management for applications (AKMA) subscription data of a user is updated, determining, by the first network function node, a second network function node storing an AKMA context of the user; sending, by the first network function node, a subscription data management notification message to the second network function node; and receiving, by the first network function node, a subscription data management notification response message sent by the second network function node; where the subscription data management notification response message is sent after the second network function (Continued)

node deletes the AKMA context of the user according to the subscription data management notification message.

9 Claims, 7 Drawing Sheets

(56) References Cited

U.S. PATENT DOCUMENTS

| | | | |
|---|---|---|---|
| 2019/0261179 A1* | 8/2019 | Hu | H04W 12/04 |
| 2020/0092720 A1* | 3/2020 | Chin | H04L 63/162 |
| 2020/0107253 A1* | 4/2020 | Albasheir | H04L 43/0858 |
| 2021/0195408 A1* | 6/2021 | Yang | H04W 12/02 |
| 2021/0360074 A1* | 11/2021 | Long | H04L 67/02 |
| 2022/0295272 A1* | 9/2022 | Peng | H04W 12/0431 |

OTHER PUBLICATIONS

Samsung: "Support for AKMA context Deregistration option in AKMA", 3GPP Draft; S3-201968, 3rd Generation, Aug. 2020 (4 pages).

3rd Generation Partnership Project; Technical Specification Group Services and System Aspects; Authentication and Key Management for Applications (AKMA) based on 3GPP credentials in the 5G System (SGS) (Release 16) 3rd Generation Partnership Project (3GPP); TS 33.535, Sep. 25, 2020 (19 pages).

International Search Report and Written Opinion with English Translation for International Patent Application No. PCT/CN2021/121564 dated Dec. 29, 2021, 9 pages.

Samsung, "Support for AKMA context Deregistration option in AKMA", 3GPP TSG-SA3 Meeting #100e S3-201968, Aug. 28, 2020, 4 pages.

* cited by examiner

SUBSCRIPTION DATA UPDATE METHOD AND APPARATUS, NODE, AND STORAGE MEDIUM

CROSS-REFERENCE TO RELATED APPLICATION

This application is a continuation application of PCT International Patent Application No. PCT/CN2021/121564, filed with the China National Intellectual Property Administration, PRC on Sep. 29, 2021 which claims priority to Chinese Patent Application No. 202011111639.9, filed with the China National Intellectual Property Administration, PRC on Oct. 16, 2020, each of which is incorporated herein by reference in its entirety.

TECHNICAL FIELD

The present application relates to the technical field of wireless communication, for example, to a subscription data update method and apparatus, a node, and a storage medium.

BACKGROUND

According to the definition of the 3rd Generation Partnership Project (3GPP) Standards Working Group, the 5th Generation Mobile Communication Technology (5G) system includes a 5G radio access network (5G RAN) subsystem and a 5G core (5GC) subsystem. As shown in FIG. 1, the architecture of the 5G system includes multiple network functions (NF). The 5G RAN subsystem includes a new radio (NR) base station, that is, a radio access node (AN). The 5G core network subsystem includes unified data management (UDM), access management function (AMF), session management function (SMF), user plane function (UPF), policy control function (PCF), security anchor function (SEAF), authentication server function (AUSF) and authentication credential repository and processing function (ARPF). The 5G network includes a subscription concealed identifier (SUCI) and a subscription permanent identifier (SUPI), where the SUPI may include an international mobile subscriber identification number (IMSI) or a network access identifier (NAI).

FIG. 2 is a schematic diagram of the architecture for authentication and key management for applications (AKMA) based on service-based architecture. Compared with the 5G system, the AKMA introduces a new network function, AKMA anchor function (AAnF). The AAnF is located in a home network and is mainly used for generating the session key between a user equipment (UE) and an application function (AF) and maintaining the security context between the AAnF and the UE. The AAnF is similar to Bootstrapping Server Function (BSF) in General Bootstrapping Architecture (GBA), and the interface Ua* between the UE and the AF is similar to the Ua interface in the GBA. Nnef, Nausf, Naanf, and Namf in FIG. 2 are service-based interfaces for the network explosion function (NF), AUSF, AAnF, and AMF, respectively.

FIG. 3 is a schematic diagram of key derivation architecture for an authentication and key management system for applications. A UE accesses a 5G network, and after authentication through 5G-authentication and key agreement (AKA), that is, 5G-AKA, or extensible authentication protocol-AKA', that is, EAP-AKA', succeeds, the AUSF and the UE generate a key KAUSF, an AKMA anchor key $K_{AKMA}$ is derived from the key KAUSF, and a mobile equipment (ME) and the AAnF derive an application key KAF from the key $K_{AKMA}$, where the AUSF and the AAnF are both in the home network.

SUMMARY

Embodiments of the present application provide a subscription data update method and apparatus, a node, and a storage medium so that in a case where user subscription data is updated, a second network function node does not retain the context associated with AKMA, thereby avoiding the situation that the AKMA traffic is abused by an attacker.

The embodiments of the present application provide a subscription data update method which includes: in a case where a first network function node determines that AKMA subscription data is updated, determining, by the first network function node, a second network function node storing an AKMA context of a user; sending, by the first network function node, a subscription data management notification message to the second network function node; and receiving, by the first network function node, a subscription data management notification response message sent by the second network function node. Where the subscription data management notification response message is sent after the second network function node deletes the AKMA context of the user according to the subscription data management notification message.

The embodiments of the present application provide a subscription data update method which includes: receiving, by a third network function node, a query message sent by a first network function node; determining, by the third network function node, a second network function node according to the query message; and sending, by the third network function node, a query response message to the first network function node. Where the query response message carries an identifier or an address of the second network function node.

The embodiments of the present application provide a subscription data update method which includes: determining, by a fourth network function node, a second network function node; and sending, by the fourth network function node, a message to a first network function node. Where the message carries an identifier or an address of the second network function node.

The embodiments of the present application provide a subscription data update apparatus which includes: a determination module, which is configured to, in a case of determining that AKMA subscription data of a user is updated, determine a second network function node storing an AKMA context of the user; a sending module, which is configured to send a subscription data management notification message to the second network function node; and a receiving module, which is configured to receive a subscription data management notification response message sent by the second network function node; where the subscription data management notification response message is sent after the second network function node deletes the AKMA context of the user according to the subscription data management notification message.

The embodiments of the present application provide a subscription data update apparatus which includes: a receiving module, which is configured to receive a query message sent by a first network function node; a determination module, which is configured to determine a second network function node according to the query message; and a sending module, which is configured to send a query response message to the first network function node, where the query response message carries an identifier or an address of the second network function node.

The embodiments of the present application provide a subscription data update apparatus which includes: a determination module, which is configured to determine a second network function node; and a sending module, which is configured to send a message to a first network function node; where the message carries an identifier or an address of the second network function node.

The embodiments of the present application provide a network function node. The node includes a processor which, when a program is executed by the processor, performs the subscription data update method provided by the embodiments of the present application.

The embodiments of the present application provide a readable/writable storage medium which is used for computer storage. The storage medium stores one or more programs, where the one or more programs may be executed by one or more processors to perform the subscription data update method provided by the embodiments of the present application.

The embodiments of the present application provide a subscription data update method and apparatus, a node, and a storage medium. The method includes the following: in a case where a first network function node determines that AKMA subscription data of a user is updated, the first network function node determines a second network function node storing an AKMA context of the user; the first network function node sends a subscription data management notification message to the second network function node; and the first network function node receives a subscription data management notification response message sent by the second network function node; where the subscription data management notification response message is sent after the second network function node deletes the AKMA context of the user according to the subscription data management notification message. Through such a design manner, in a case where the user subscription data is updated, the second network function node does not retain the context associated with AKMA, thereby avoiding the situation that the AKMA traffic is abused by an attacker.

DETAILED DESCRIPTION

Figure 1:
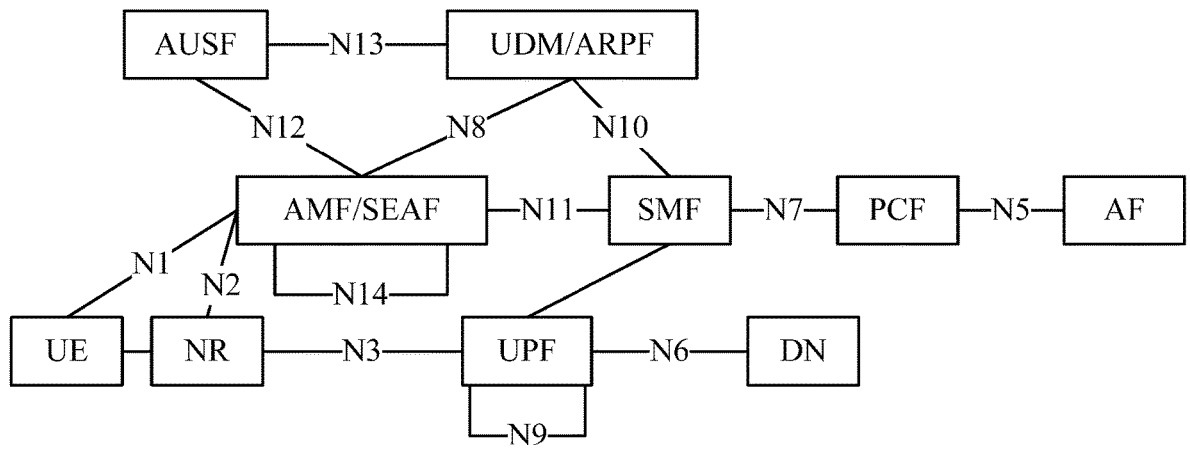
FIG. 1 is a schematic diagram of the architecture of a 5G system in the related art.
Figure 2:
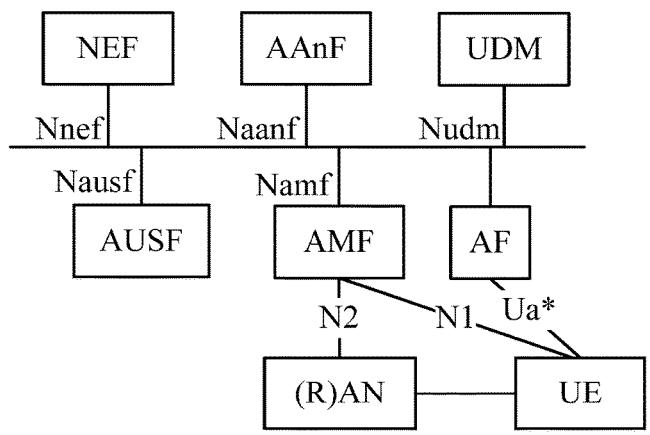
FIG. 2 is a schematic diagram of the architecture for an authentication and key management system for applications in the related art.
Figure 3:
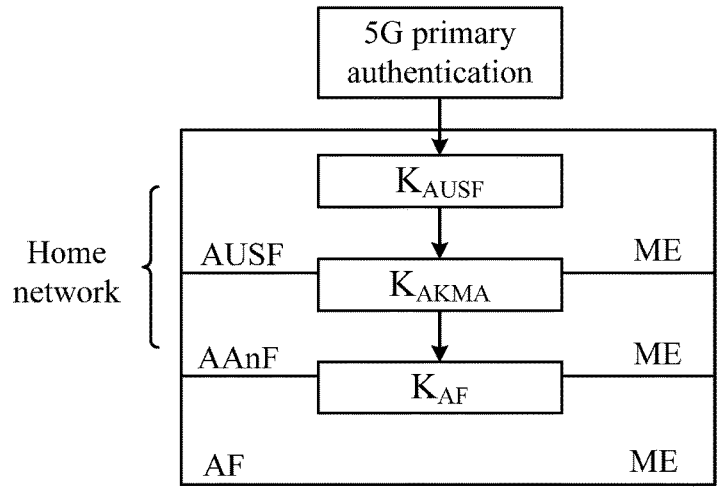
FIG. 3 is a schematic diagram of key derivation architecture for an authentication and key management system for applications in the related art.

Embodiments of the present application are described hereinafter in detail in conjunction with the drawings. It is to be noted that if not in collision, the embodiments described herein and the features thereof may be combined with each other.

In addition, in the embodiments of the present application, the word "optionally" or "for example" is used herein to mean serving as an example, instance or illustration. Any embodiment or design scheme described as "optional" or "example" in the embodiments of the present application should not be construed as being more preferred or advantageous than other embodiments or design schemes. The use of the word "optionally" or "for example" is intended to present concepts in a concrete fashion.

In the related art, the key $K_{AKMA}$ is usually generated by reusing a 5G primary authentication procedure (that is, the above-mentioned 5G-AKA or EAP-AKA'). After the authentication succeeds, the UE and the AUSF derive the AKMA anchor key $K_{AKMA}$ from the key KAUSF, and meanwhile, the AKMA-key identifier (A-KID) associated with the key $K_{AKMA}$ is generated. In this manner, the key $K_{AKMA}$ may be updated only through the 5G primary authentication procedure. The AKMA technology provides end-to-end security protection from users to applications for 5G network users. If the user subscription data is updated, the use of the AKMA traffic is affected. If the AAnF continues to retain the security context associated with the AKMA, attackers may use the AKMA traffic, leading to the possibility that the AKMA traffic may be abused by attackers.

For ease of understanding of the methods provided by the embodiments of the present application, the related concepts of network function node functions involved in the embodiments of the present application and drawings are further described below.

The UDM is used for permanently storing user subscription data and is located in a home network subscribed by the user. The ARPF stores long-term key credentials for authentication and uses the long-term key credentials as the input to perform key operations. The UDM and the ARPF are located in the secure environment of an operator or third-party system and are not exposed to unauthorized physical access. In addition, the ARPF and the AUSF can interact with each other.

The AMF is used for managing the demand of the user for accessing the network and is responsible for the signaling management of non-access stratum (NAS) from the terminal to the network, user mobility management and other functions. The AMF has a SEAF, the AMF/SEAF interacts with the AUSF and the UE, and receives an intermediate key established for the UE authentication procedure. Based on the authentication method of the universal subscriber identity module (USIM), the AMF acquires security-related data from the AUSF.

The AUSF has an authentication function to interact with the ARPF and can terminate the request from the SEAF. The AUSF is located in the secure environment of an operator or third-party system and is not exposed to unauthorized physical access.

The SMF is used for managing a packet data unit (PDU) session and quality of service (QOS) flow of the user and formulating packet detection and forwarding rules for the UPF.

The UPF is responsible for functions such as the routing and forwarding of Internet Protocol (IP) data and non-IP data, usage reporting and the like.

The PCF is responsible for providing policy rules at all levels for the AMF and the SMF.

Data network (DN) includes networks such as operator services, network access and third-party services.

The AF is used for managing AF sessions.

The SUCI consists of six parts, as follows:

(1) SUPI type, with values of 0 to 7, where the value 0 is IMSI, the value 1 is the network access identifier (NAI), and others are to be used.

(2) Home network identifier, which identifies the users of the home network. Where when the SUPI is the IMSI, the home network identifier consists of a mobile country code (MCC) and a mobile network code (MNC); and when the SUPI is the NAI, the NAI is defined by Section 2.2 of IETF RFC 7542.

(3) Routing indicator (RID), which is allocated by the operator of the home network, configured in the USIM, and together with the home network identifier, indicates that the network signaling is routed to the AUSF and the UDM of the serving user.

(4) Protection scheme identifier, which refers to one of null-scheme or non-null-scheme.

(5) Home network public key identifier, which represents an identifier of a public key provided by a home network to protect the SUPI, where in a case of null-scheme, the value of the home network public key identifier is 0.

(6) Scheme output, where in a case of null-scheme, the scheme output is the NAI or the mobile subscriber identification number (MSIN) of the IMSI; and in a case of non-null-scheme, the scheme output is the values of the MSIN and the NAI using elliptic curve cryptography (EEC).

For example, when the IMSI is 234150999999999, that is, MCC=234, MNC=15 and MSIN-099999999, the routing indicator is 678, and when the home network public key identifier is 27, the SUCI of null-scheme is composed of 0, 234, 15, 678, 0, 0 and 0999999999, and the SUCI of non-null-scheme is composed of 0, 234, 15, 678, 1, 27, <elliptic curve cryptography (EEC) ephemeral public key value>, <encryption 09999999> and <message authentication code (MAC) value (MAC tag value)>.

Figure 4:
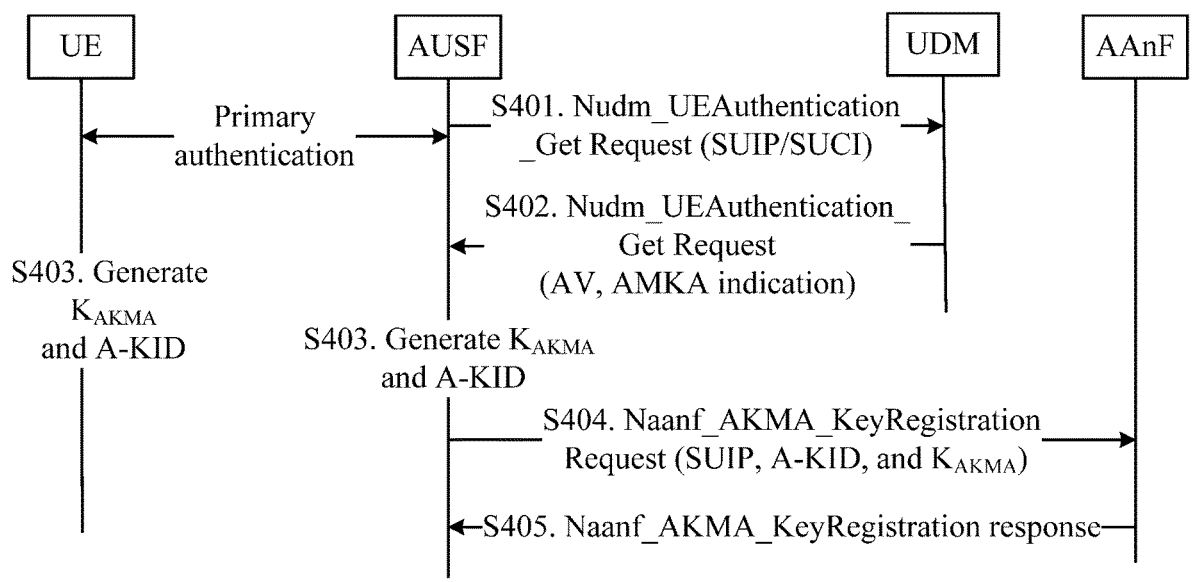
FIG. 4 is a flowchart of an AKMA anchor key generation method in the related art.

As shown in FIG. 4, the 5G primary authentication procedure includes S401, S402, S403, S404 and S405.

In S401, the AUSF interacts with the UDM to acquire authentication information, such as an authentication credential (e.g. AKA authentication vector (AV)), where the authentication manner is the Nudm_UEAuthentication_Get Request service operation.

In S402, in a response message, the UDM may indicate to the AUSF whether an AKMA key needs to be generated for the UE.

In S403, if the AUSF receives the AKMA indication from the UDM, the AUSF stores the KAUSF and generates the AKMA anchor key $K_{AKMA}$ and the A-KID based on the KAUSF after the primary authentication succeeds. Before the UE starts the communication with an AKMA application server, the UE generates the AKMA anchor key $K_{AKMA}$ and the A-KID based on the KAUSF.

In S404, after the AUSF generates an AKMA key material, the SUPI of the user and the generated A-KID and $K_{AKMA}$ are sent to the AAnF using the Naanf_AKMA_KeyRegistration Request service operation. The AAnF stores the latest key material sent by the AUSF.

In S405, the AAnF sends the response to the AUSF using the Naanf_AKMA_KeyRegistration Response service operation.

Figure 5:
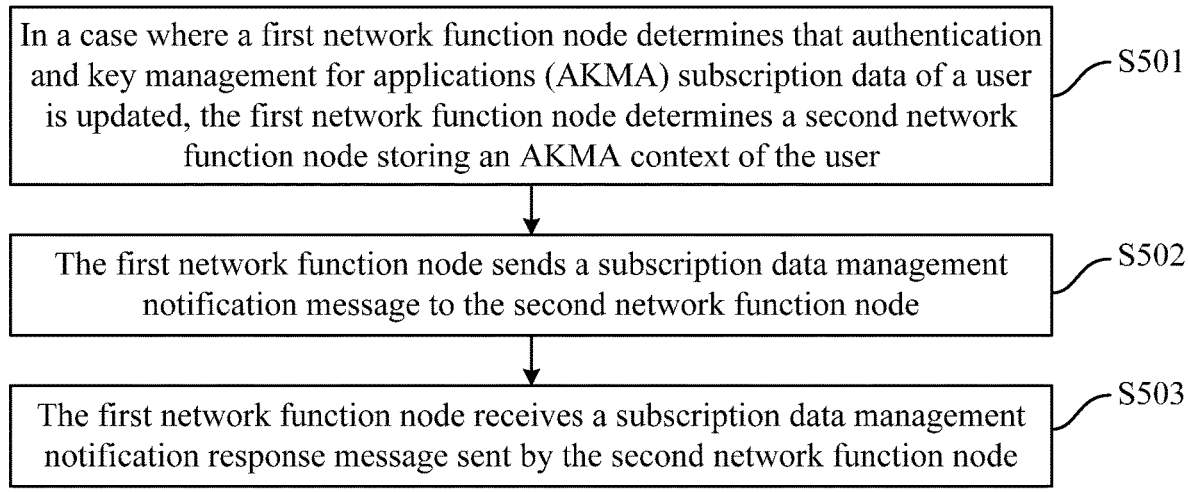
FIG. 5 is a flowchart of a subscription data update method according to an embodiment of the present application.

Based on the above-mentioned concepts, the embodiments of the present application provide a subscription data update method. The flowchart of the method is shown in FIG. 5 and includes but not limited to S501, S502 and S503.

In S501, in a case where a first network function node determines that AKMA subscription data of a user is updated, the first network function node determines a second network function node storing an AKMA context of the user.

In this embodiment of the present application, in S501, the first network function node may be understood as a UDM, and the second network function node may be understood as an AAnF.

The update of the AKMA subscription data of the user in S501 may include but is not limited to the following cases: in the first case, the user withdraws from the network and deletes the subscription message of the user in the UDM; in the second case, the user does not use the AKMA traffic and deletes the AKMA subscription information; and in the third case, the user cannot use the service due to various reasons such as arrears.

That is, S501 may be understood as that in a case where the AKMA subscription data of the user is updated, the UDM needs to confirm the AAnF that stores the AKMA context of the user.

In S502, the first network function node sends a subscription data management notification message to the second network function node.

When the first network function node determines the second network function node and sends the subscription data management notification message to the second network function node, the user identifier SUPI may be carried in the subscription data management notification message. Optionally, the AKMA subscription indication of the user may also be carried in the subscription data management notification message.

In S503, the first network function node receives a subscription data management notification response message sent by the second network function node.

After the second network function node receives the subscription data management notification message sent by the first network function node, the second network function node may delete the stored AKMA context of the user such as the SUPI, the A-KID and the $K_{AKMA}$ according to the user identifier SUPI carried in the subscription data management notification message and then send the subscription data management notification response message to the first network function node.

This embodiment of the present application provides a subscription data update method, where the method includes the following: in a case where a first network function node determines that AKMA subscription data of a user is updated, the first network function node determines a second network function node storing an AKMA context of the user; the first network function node sends a subscription data management notification message to the second network function node; and the first network function node receives a subscription data management notification response message sent by the second network function node. Where the subscription data management notification response message is sent after the second network function node deletes the AKMA context of the user according to the subscription data management notification message. Through such a design manner, in a case where the user subscription data is updated, the second network function node does not retain the context associated with AKMA, thereby avoiding the situation that the AKMA traffic is abused by an attacker.

In an embodiment, the implementation of the above S501 may include but is not limited to the following cases: in the first case, the first network function node determines the second network function node according to a local configuration; in the second case, the first network function node determines the second network function node through a third network function node; and in the third case, the first network function node determines the second network function node through a fourth network function node.

Figure 6:
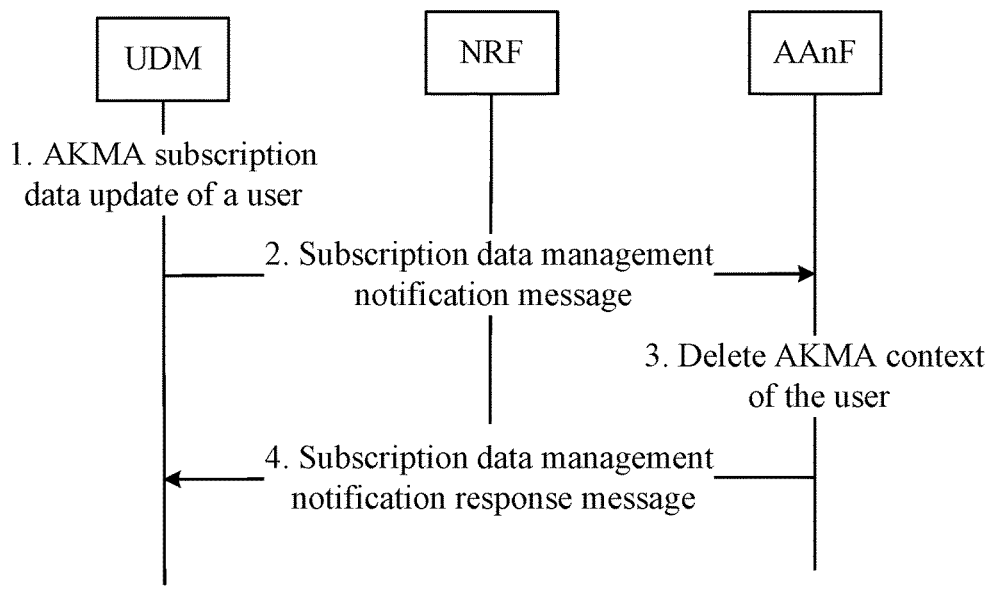
FIG. 6 is a diagram showing the signaling interaction of a subscription data update method according to an embodiment of the present application.

As shown in FIG. 6, the implementation of the abovementioned first case may include that the first network function node determines the second network function node according to a partial field of a user identifier.

For example, the partial field may include the MCC, the MNC and the like.

Figure 7:
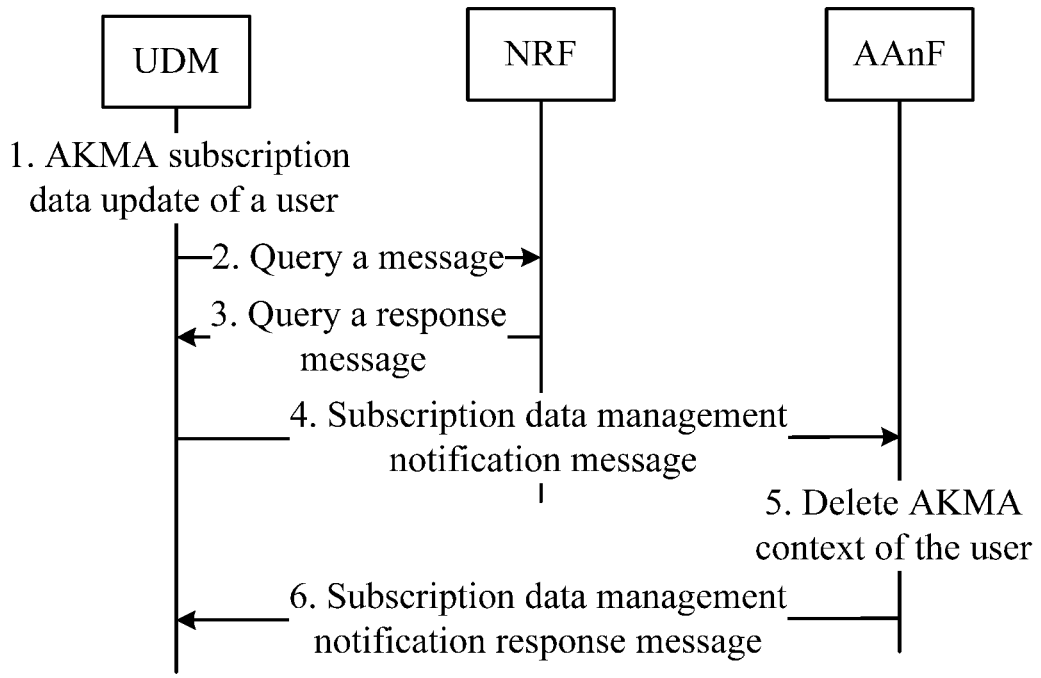
FIG. 7 is a diagram showing the signaling interaction of another subscription data update method according to an embodiment of the present application.

As shown in FIG. 7, the implementation of the second case may include the following processes: the first network function node sends a query message to the third network function node; the first network function node receives a query response message sent by the third network function node according to the query message, where the query response message carries an identifier or an address of the second network function node; and the first network function node determines the second network function node according to the query response message.

For example, the query message may carry a network function name (such as the AAnF) and/or a network type (such as the AAnF type) and a user identifier SUPI and/or the location information of the first network function node. The third network function node may be a network repository function (NRF), that is, the NRF queries the AAnF storing the AKMA context of the user according to the SUPI and/or the UDM location information and the AAnF network function name and/or the AAnF network type in the query message and then sends a query response message to the UDM.

Figure 8:
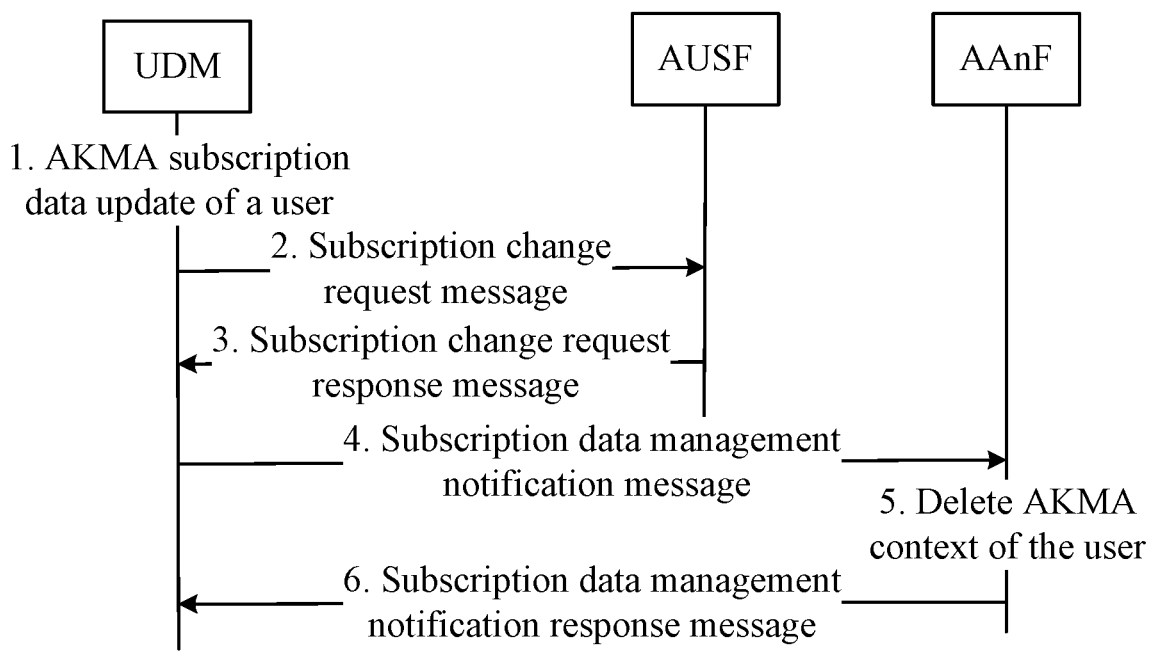
FIG. 8 is a diagram showing the signaling interaction of another subscription data update method according to an embodiment of the present application.

As shown in FIG. 8, in an embodiment, the implementation of the third case may include the following processes: the first network function node sends a subscription change request message to the fourth network function node; the first network function node receives a subscription change request response message sent by the fourth network function node, where the subscription change request response message carries an identifier or an address of the second network function node; and the first network function node determines the second network function node according to the subscription change request response message.

For example, the fourth network function node may be an AUSF, and the subscription change request may carry a network function name (such as the AAnF) and/or a network type (such as the AAnF type) and a user identifier SUPI and/or the location information of the first network function node. That is, the AUSF queries the AAnF storing the AKMA context of the user according to the SUPI and/or the UDM location information and the AAnF network function name and/or the AAnF network type and sends the query result to the UDM in the form of the subscription change request response message.

Figure 9:
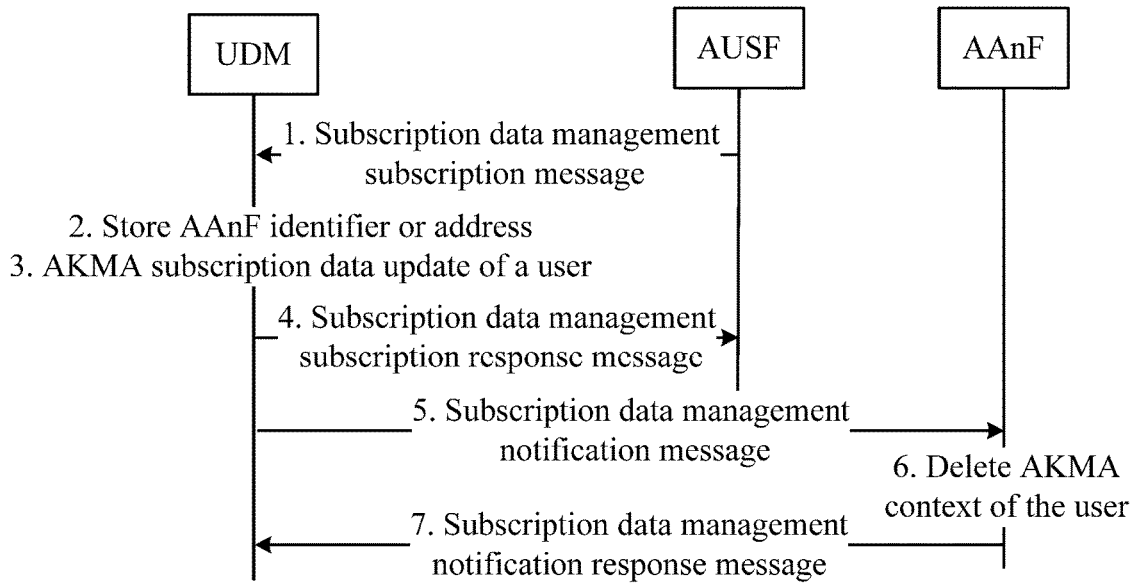
FIG. 9 is a diagram showing signaling interaction of another subscription data update method according to an embodiment of the present application.

As shown in FIG. 9, in an embodiment, the implementation of the third case may include the following processes: the first network function node receives a subscription data management subscription message sent by the fourth network function node, where the subscription data management subscription message carries an identifier or an address of the second network function node; the first network function node stores the identifier or the address of the second network function node according to the subscription data management subscription message; and the first network function node determines the second network function node according to the stored identifier or the address of the second network function node.

Optionally, after the first network function node receives the subscription data management subscription message sent by the fourth network function node, the first network function node may further send a subscription data management subscription response message to the fourth network function node.

It is to be noted that before the first network function node receives the subscription data management subscription message sent by the fourth network function node, the first network function node may further execute the primary authentication procedure through the fourth network function node, where the primary authentication procedure is the implementation mode provided in FIG. 4 of the present application. As can be seen from FIG. 4, after the AUSF generates the AKMA key material, the AUSF sends the AKMA key material to the AAnF, and the AAnF stores the AKMA key material. In this manner, when the AKMA subscription data of the user is updated, the UDM may send the subscription data management notification message to the AAnF according to the stored identifier or address of the AAnF.

Figure 10:
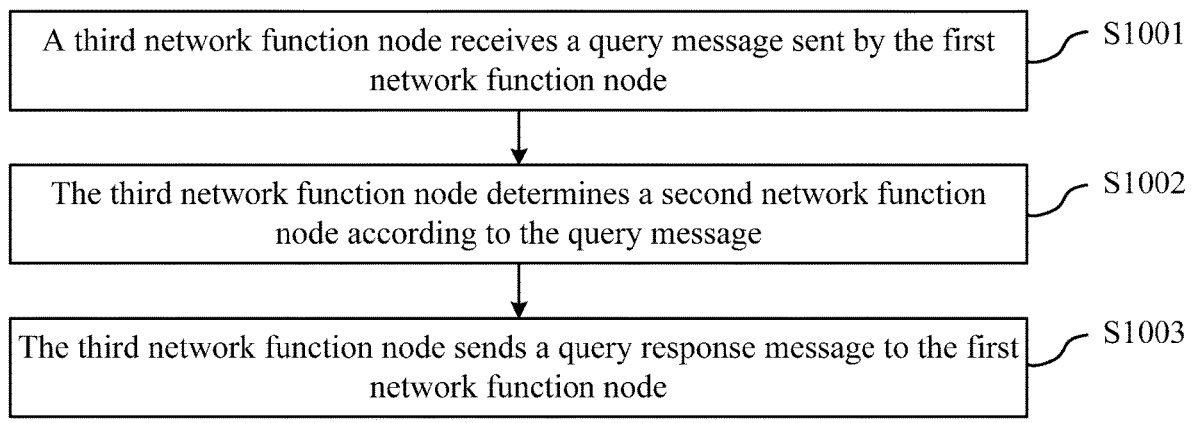
FIG. 10 is a flowchart of another subscription data update method according to an embodiment of the present application.

FIG. 10 is a flowchart of another subscription data update method according to an embodiment of the present application. As shown in FIG. 10, the method may include but is not limited to S1001, S1002 and S1003.

In S1001, a third network function node receives a query message sent by the first network function node.

In this embodiment of the present application, the third network function node may be an NRF, the first network function node may be a UDM, and the query message sent by the first network function node may carry the network function name and/or the network type and the user identifier and/or the location information of the first network function node.

In S1002, the third network function node determines a second network function node according to the query message.

The third network function node queries the second network function node according to the network function name and/or the network type and the user identifier and/or the location information of the first network function node in the query message.

The second network function node may be an AAnF, and the AAnF is used for storing the AKMA context of the user.

In S1003, the third network function node sends a query response message to the first network function node.

The query response message sent by the third network function node carries an identifier or an address of the second network function node.

This embodiment of the present application provides a subscription data update method which includes: a third network function node receives a query message sent by a first network function node; the third network function node determines a second network function node according to the query message; and the third network function node sends a query response message to the first network function node, where the query response message carries an identifier or an address of the second network function node. Through the solution described above, the second network function node can be effectively determined so that in a case where the user subscription data is updated, the first network function node can send the subscription data management notification message to the second network function node and the second network function node does not retain the context associated with AKMA, thereby avoiding the situation that the AKMA traffic is abused by an attacker.

Figure 11:
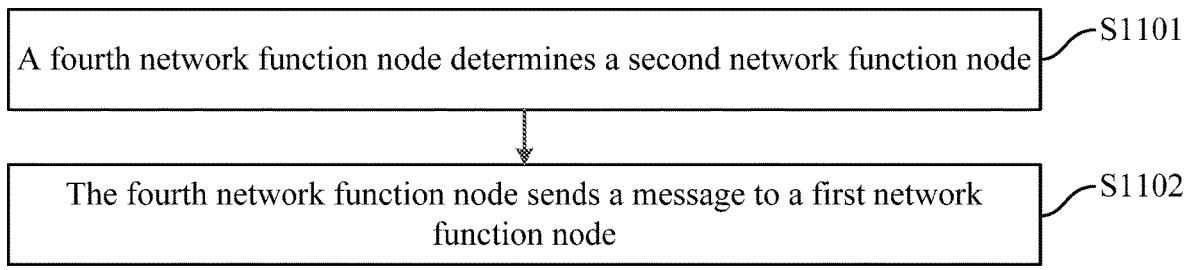
FIG. 11 is a flowchart of another subscription data update method according to an embodiment of the present application.

FIG. 11 is a flowchart of another subscription data update method according to an embodiment of the present application. As shown in FIG. 11, the method may include but is not limited to S1101 and S1102.

In S1101, a fourth network function node determines a second network function node.

In this embodiment of the present application, the fourth network function node may be an AUSF, the second network function node may be an AAnF, and the AAnF is used for storing the AKMA context of the user.

For example, the implementation mode of S1101 may include the following: the fourth network function node receives a subscription change request message sent by the first network function node, where the subscription change request message carries a user identifier; and the fourth network function node queries the second network function node according to the user identifier.

The first network function node may be a UDM, that is, after the AUSF receives the subscription change request message sent by the UDM, the AUSF queries the AAnF storing the AKMA context of the user according to the user identifier in the message.

In S1102, the fourth network function node sends a message to a first network function node.

The message sent by the fourth network function node may carry an identifier or an address of the second network function node.

This embodiment of the present application provides a subscription data update method which includes: a fourth network function node determines a second network function node; and the fourth network function node sends a message to a first network function node; where the message carries an identifier or an address of the second network function node. Through the solution described above, the first network function node can determine the second network function node so that in a case where the user subscription data is updated, the first network function node sends the subscription data management notification message to the second network function node and the second network function node does not retain the context associated with AKMA, thereby avoiding the situation that the AKMA traffic is abused by an attacker.

Figure 12:
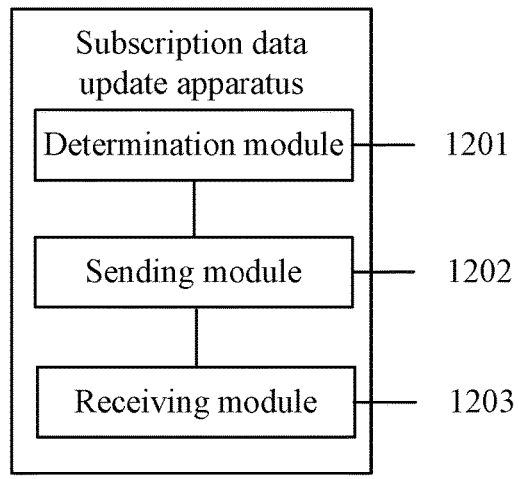
FIG. 12 is a structural diagram of a subscription data update apparatus according to an embodiment of the present application.

FIG. 12 is a structural diagram of a subscription data update apparatus according to an embodiment of the present application. As shown in FIG. 12, the apparatus may include a determination module 1201, a sending module 1202 and receiving module 1203. The determination module is configured to, in a case of determining that AKMA subscription data of a user is updated, determine a second network function node storing an AKMA context of the user. The sending module is configured to send a subscription data management notification message to the second network function node. The receiving module is configured to receive a subscription data management notification response message sent by the second network function node. Where the subscription data management notification response message is sent after the second network function node deletes the AKMA context of the user according to the subscription data management notification message.

In an example, the determination module is configured to: determine the second network function node according to a local configuration; determine the second network function node through a third network function node; and determine the second network function node through a fourth network function node.

In an example, the determination module is configured to determine the second network function node according to a partial field of a user identifier.

In an example, the determination module may include a communication unit and a determination unit. The communication unit is configured to: send a query message to the third network function node and receive a query response message sent by the third network function node according to the query message, where the query response message carries an identifier or an address of the second network function node. The determination unit is configured to determine the second network function node according to the query response message.

In an example, the determination module may include a communication unit and a determination unit. The communication unit is configured to: send a subscription change request message to the fourth network function node and receive a subscription change request response message sent by the fourth network function node, where the subscription change request response message carries an identifier or an address of the second network function node. The determination unit is configured to determine the second network function node according to the subscription change request response message.

The query message may carry a network function name and/or a network type and a user identifier and/or the location information of the first network function node. The subscription change request message may carry a network function name and/or a network type and a user identifier and/or the location information of the first network function node.

In an example, the determination module may include a communication unit, a storage unit and a determination unit. The communication unit is configured to receive a subscription data management subscription message sent by the fourth network function node, where the subscription data management subscription message carries an identifier or an address of the second network function node. The storage unit is configured to store the identifier or the address of the second network function node according to the subscription data management subscription message. The determination unit is configured to determine the second network function node according to the stored identifier or the address of the second network function node.

In an example, the apparatus may further include an authentication module which is configured to execute a primary authentication procedure through the fourth network function node.

The subscription data update apparatus provided by this embodiment is used for implementing the subscription data update methods of the embodiments shown in FIGS. 5, 6, 7, 8 and 9. The implementation principles and technical effects of the apparatus are similar to those of the methods, and details are not repeated herein.

Figure 13:
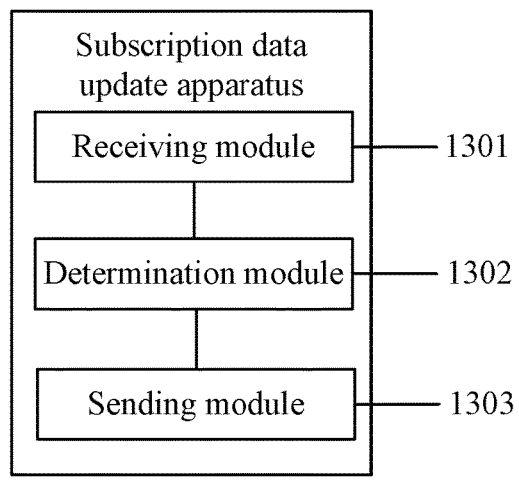
FIG. 13 is a structural diagram of another subscription data update apparatus according to an embodiment of the present application.

FIG. 13 is a structural diagram of another subscription data update apparatus according to an embodiment of the present application. As shown in FIG. 13, the apparatus may include a receiving module 1301, a determination module 1302 and a sending module 1303. The receiving module is configured to receive a query message sent by a first network function node. The determination module is configured to determine a second network function node according to the query message. The sending module is configured to send a query response message to the first network function node, where the query response message carries an identifier or an address of the second network function node.

The query message carries a network function name and/or a network type and a user identifier and/or the location information of the first network function node.

The subscription data update apparatus provided by this embodiment is used for implementing the subscription data update method of the embodiment shown in FIG. 10. The implementation principles and technical effects of the apparatus are similar to those of the method, and details are not repeated herein.

Figure 14:
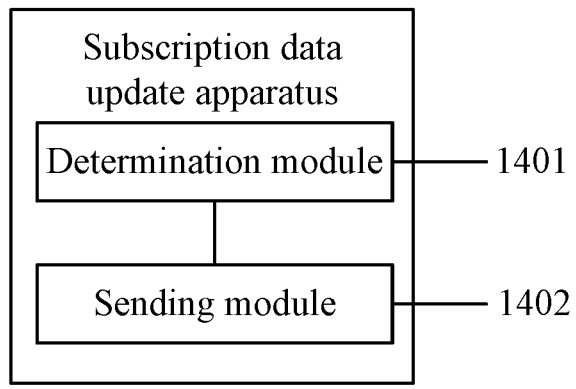
FIG. 14 is a structural diagram of another subscription data update apparatus according to an embodiment of the present application.

FIG. 14 is a structural diagram of another subscription data update apparatus according to an embodiment of the present application. As shown in FIG. 14, the apparatus may include a determination module 1401 and a sending module 1402. The determination module is configured to determine a second network function node. The sending module is configured to send a message to a first network function node, where the message carries an identifier or an address of the second network function node.

Optionally, the determination module may include a communication unit and a query unit. The communication unit is configured to receive a subscription change request message sent by the first network function node, where the subscription change request message carries a user identifier. The query unit is configured to query the second network function node according to the user identifier.

The subscription data update apparatus provided by this embodiment is used for implementing the subscription data update method of the embodiment shown in FIG. 11. The implementation principles and technical effects of the apparatus are similar to those of the method, and details are not repeated herein.

Figure 15:
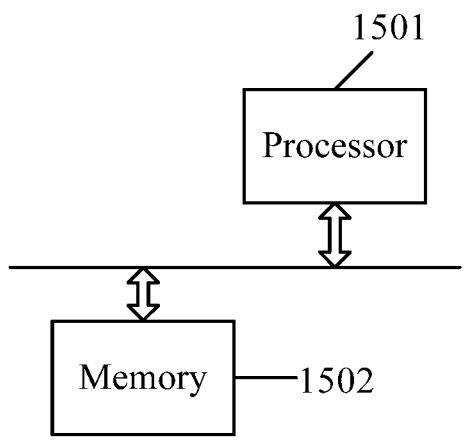
FIG. 15 is a structural diagram of a network function node according to an embodiment of the present application.

FIG. 15 is a structural diagram of a network function node according to an embodiment of the present application. As shown in FIG. 15, the network function node includes a processor 1501 and a memory 1502. The number of processors 1501 in the network function node may be one or more, and one processor 1501 is illustrated as an example in FIG. 15. The processor 1501 and the memory 702 in the network function node may be connected via a bus or in other manners, and the connection via the bus is illustrated as an example in FIG. 15.

As a computer-readable storage medium, the memory 1502 may be configured to store software programs, computer-executable programs and modules, such as program instructions/modules corresponding to the method in any of the embodiments of the present application shown in FIGS. 5 to 11. The processor 1501 runs the software programs, instructions or modules stored in the memory 1502 to perform the methods in the embodiments shown in FIGS. 5 to 11.

The memory 1502 may mainly include a program storage region and a data storage region, where the program storage region may store an operating system and an application program required by at least one function while the data storage region may store data created depending on the use of a set-top box. Furthermore, the memory 1502 may include a high-speed random-access memory, and may also include a non-volatile memory such as at least one disk memory, flash memory or other non-volatile solid-state memories.

In an example, if possible, the processor in the node may also implement the subscription data update method through its internal logic circuit, gate circuit and other hardware circuits.

The embodiments of the present application further provide a readable/writable storage medium which is used for computer storage. The storage medium stores one or more programs, where the one or more programs, when executed by one or more processors, may perform the method provided by any of the embodiments shown in FIGS. 5 to 11.

It is to be understood by those having ordinary skill in the art that function modules/units in all or part of the steps of the method and the device disclosed in the preceding description may be implemented as software, firmware, hardware or any appropriate combination thereof.

In a hardware implementation, the division of the function modules/units may not correspond to the division of physical components. For example, one physical component may have several functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). As is known to those having ordinary skill in the art, the term computer storage media include volatile and non-volatile as well as removable and non-removable media implemented in any method or technology for storing information (such as computer-readable instructions, data structures, program modules or other data). The computer storage media include, but are not limited to, a random-access memory (RAM), a read-only memory (ROM), an electrically erasable programmable read-only memory (EEPROM), a flash memory or another memory technology, a compact disc read-only memory (CD-ROM), a digital versatile disc (DVD) or another optical disc storage, a magnetic cassette, a magnetic tape, disk storage or another magnetic storage apparatus, or any other medium used to store the desired information and accessible by a computer. Moreover, as is known to those having ordinary skill in the art, the communication media generally include computer-readable instructions, data structures, program modules or other data in carriers or in modulated data signals transported in other transport mechanisms and may include any information delivery medium.

The preferred embodiments of the present application are illustrated herein with reference to drawings and are not intended to limit the scope of the present application. Any modification, equivalent substitution and improvement made by those skilled in the art without departing from the scope and spirit of the present application shall fall within the scope of the present application.

What is claimed is:

1. A method for wireless communication, comprising:
determining, by a first network function node, a second network function node storing an authentication and key management for applications (AKMA) context of a user, via one of following manners:
determining the second network function node according to a local configuration; or
determining the second network function node by:
receiving, by the first network function node, a subscription data management subscription message sent by a third network function node, wherein the subscription data management subscription message carries an identifier or an address of the second network function node;
storing, by the first network function node, the identifier or the address of the second network function node according to the subscription data management subscription message; and
determining, by the first network function node, the second network function node according to the identifier or the address of the second network function node stored by the first network function node;
sending, by the first network function node, a subscription data management notification message to the second network function node; and
receiving, by the first network function node, a subscription data management notification response message sent by the second network function node;
wherein the subscription data management notification response message is sent after the second network function node deletes the AKMA context of the user according to the subscription data management notification message.

2. The method of claim 1, wherein the determining, by the first network function node, the second network function node according to the local configuration comprises:
determining, by the first network function node, the second network function node according to a partial field of a user identifier.

3. The method of claim 1, before the receiving, by the first network function node, the subscription data management subscription message sent by the third network function node, further comprising:
performing, by the first network function node, a primary authentication process through the third network function node.

4. A first network function node comprising a memory for storing computer instructions and a processor in communication with the memory, wherein, when the processor executes the computer instructions, the processor is configured to cause the first network function node to:
determine a second network function node storing an authentication and key management for applications (AKMA) context of a user, via one of following manners:
1) Determining the second network function node according to a local configuration; or
2) Determining the second network function node by:
receiving, by the first network function node, a subscription data management subscription message sent by a third network function node, wherein the subscription data management subscription message carries an identifier or an address of the second network function node;
storing, by the first network function node, the identifier or the address of the second network function node according to the subscription data management subscription message; and
determining, by the first network function node, the second network function node according to the identifier or the address of the second network function node stored by the first network function node;
send a subscription data management notification message to the second network function node; and
receive a subscription data management notification response message sent by the second network function node;
wherein the subscription data management notification response message is sent after the second network function node deletes the AKMA context of the user according to the subscription data management notification message.

5. The first network function node of claim 4, wherein, when the processor is configured to cause the first network function node to determine the second network function node according to the local configuration, the processor is configured to cause the first network function node to:
determine the second network function node according to a partial field of a user identifier.

6. The first network function node of claim 4, wherein, before the processor is configured to cause the first network function node to receive the subscription data management subscription message sent by the third network function node, the processor is configured to further cause the first network function node to:
perform a primary authentication process through the third network function node.

7. A non-transitory storage medium for storing computer readable instructions, the computer readable instructions, when executed by a processor in a first network function node, causing the processor to:
determine a second network function node storing an authentication and key management for applications (AKMA) context of a user, via one of following manners:
1) Determining the second network function node according to a local configuration; or
2) Determining the second network function node by:
receiving, by the first network function node, a subscription data management subscription message sent by a third network function node, wherein the subscription data management subscription message carries an identifier or an address of the second network function node;
storing, by the first network function node, the identifier or the address of the second network function node according to the subscription data management subscription message; and
determining, by the first network function node, the second network function node according to the identifier or the address of the second network function node stored by the first network function node;

send a subscription data management notification message to the second network function node; and receive a subscription data management notification response message sent by the second network function node;

wherein the subscription data management notification response message is sent after the second network function node deletes the AKMA context of the user according to the subscription data management notification message.

8. The non-transitory storage medium of claim 7, wherein, when the computer readable instructions cause the processor to determine the second network function node according to the local configuration, the computer readable instructions cause the processor to:

determine the second network function node according to a partial field of a user identifier.

9. The non-transitory storage medium of claim 7, wherein, before the computer readable instructions cause the processor to receive the subscription data management subscription message sent by the third network function node, the computer readable instructions further cause the processor to:

perform a primary authentication process through the third network function node.

\* \* \* \* \*